March 22, 1960 — A. C. RATERMANN — 2,929,475
CIRCUIT CONTROL FOR A THROTTLE HOLDER
Filed May 21, 1956 — 3 Sheets-Sheet 1
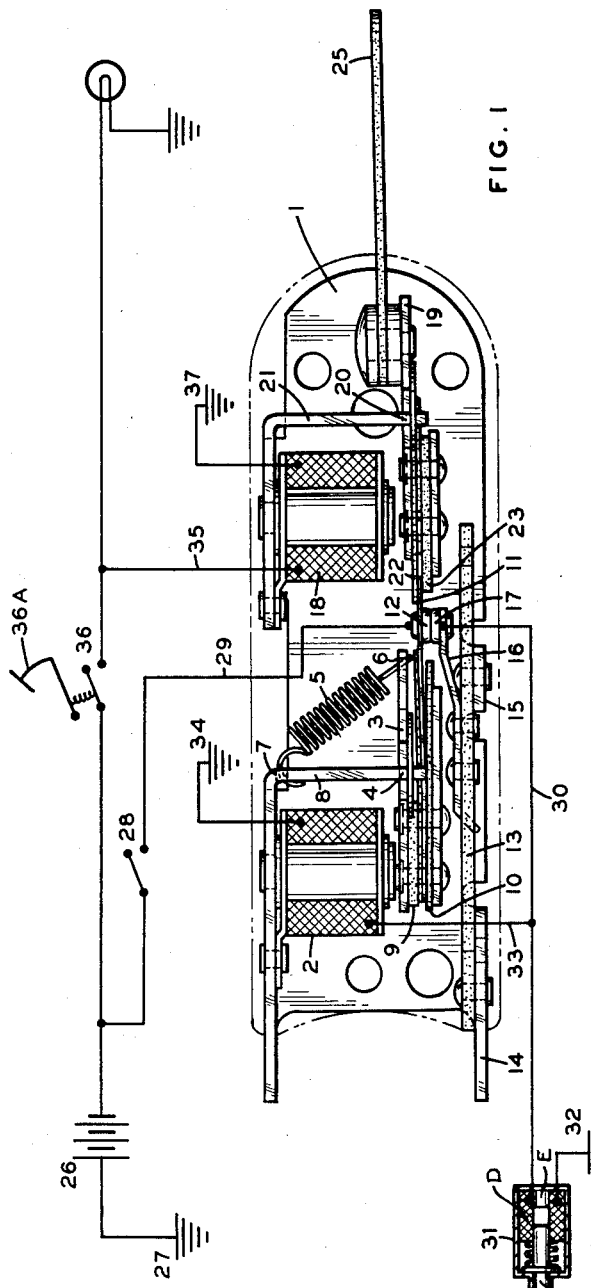
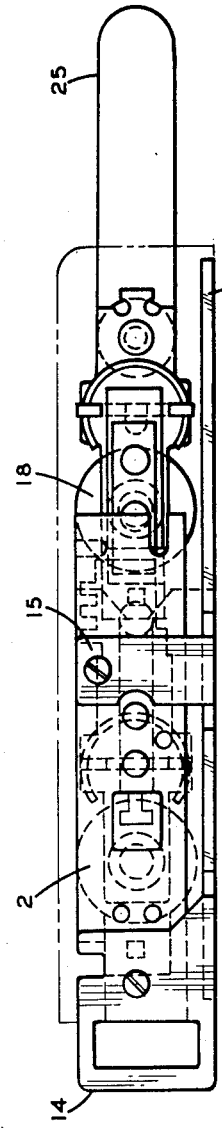
INVENTOR.
ALFRED C. RATERMANN
BY
ATTORNEY

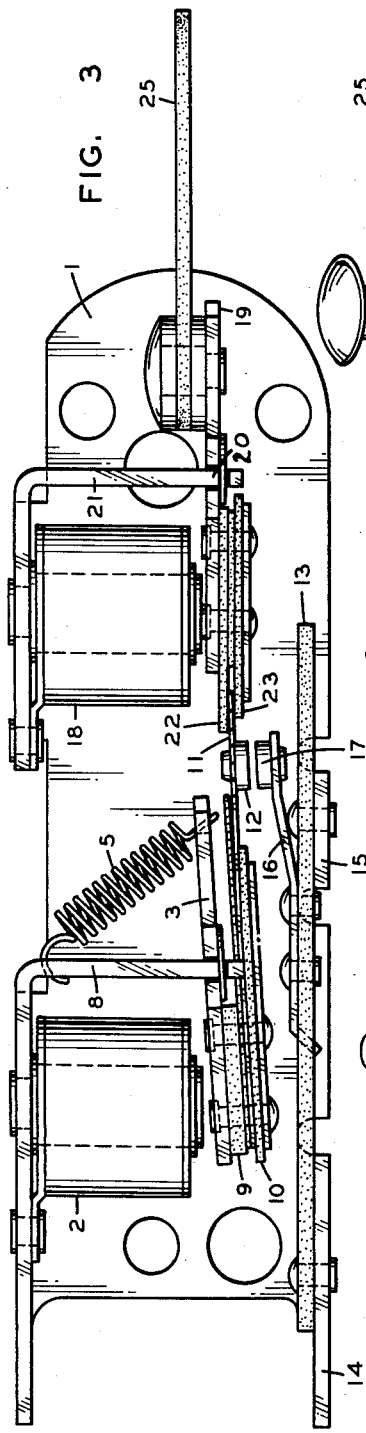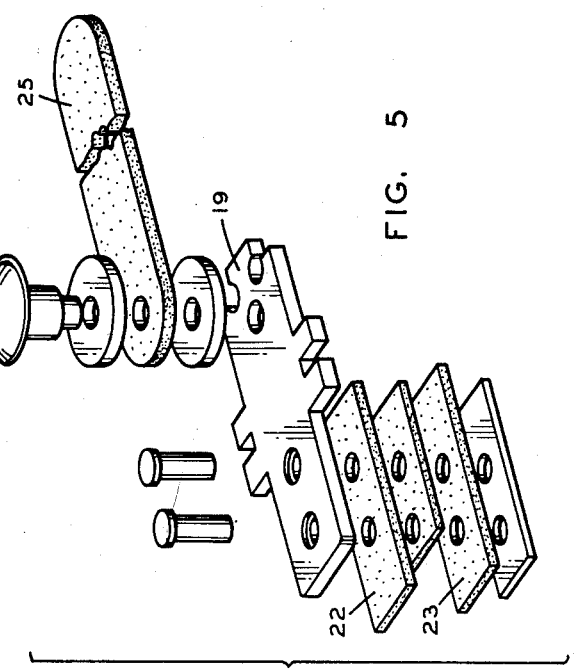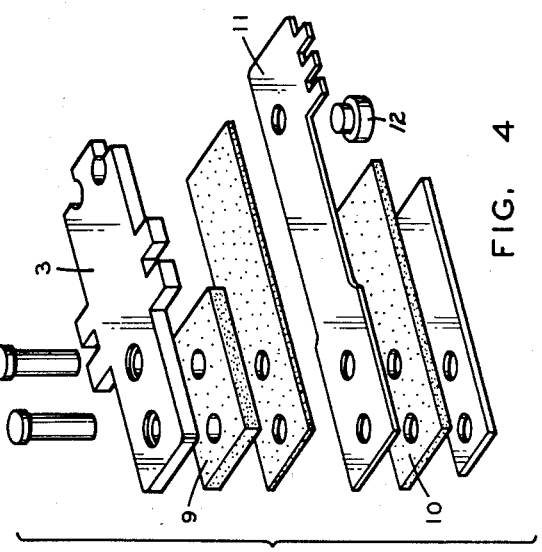

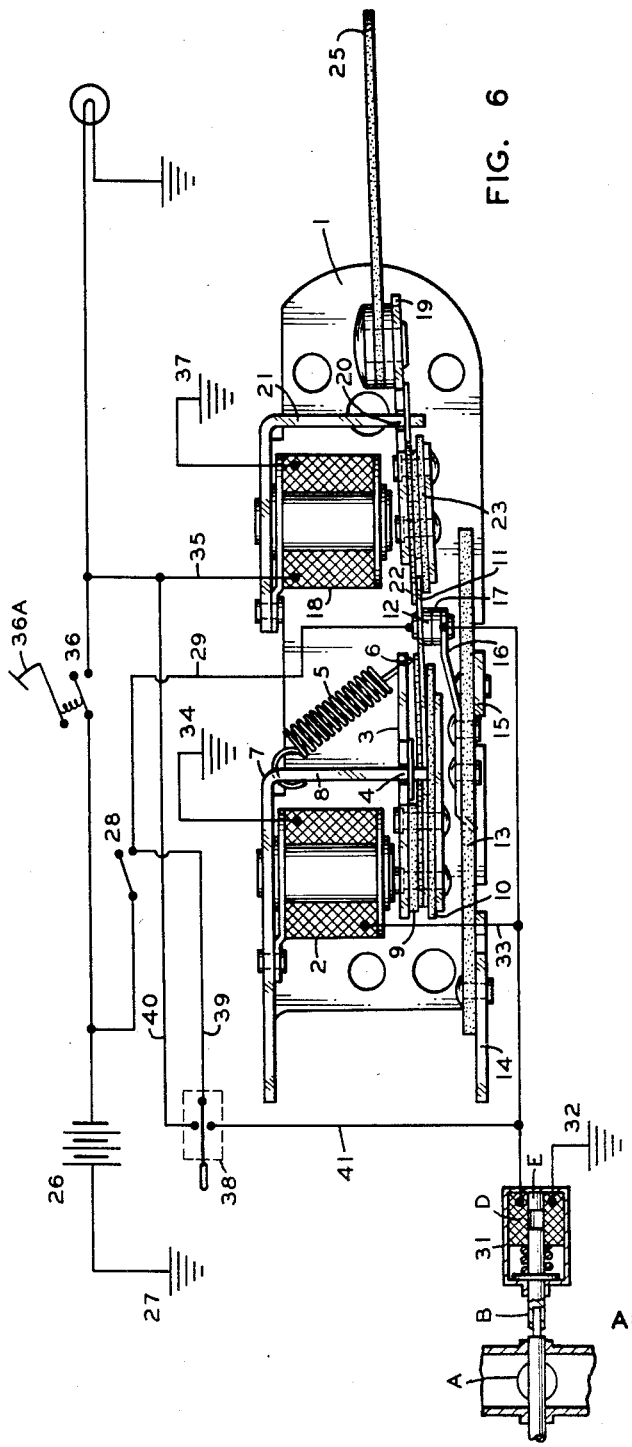

United States Patent Office 2,929,475
Patented Mar. 22, 1960

2,929,475

CIRCUIT CONTROL FOR A THROTTLE HOLDER

Alfred C. Ratermann, Okemos, Mich.

Application May 21, 1956, Serial No. 586,258

7 Claims. (Cl. 192—3)

This invention pertains to means for controlling the circuit of an electrically operated throttle holder whereby the throttle setting of an automobile may be fixed at any attained speed of the car. Such holders are applied to many cars to enable the driver to take his foot off the accelerator on long steady runs.

In an automobile equipped with such a throttle holder, since the operator substantially relinquishes control of the speed of the car while the throttle is held thereby, there is always the possibility, or at least the fear that, if a sudden emergency should arise, his confusion or lack of time may cause him to neglect to release the holder and the car will continue to move under power. Accordingly, as it is practically instinctive with every operator to step on the brake pedal first in any emergency, this invention takes advantage of such instinctive action by causing depression of the brake pedal to release the holder.

An object of this invention is to provide a control for such a holder which may be coordinated with the wheel brake pedal so that upon depression of that pedal to apply the brakes, the holder will be released so that the throttle valve may return to its idling setting.

Another object is to provide such a control adapted for either manual or electrical operation, and in which the electrical operation may be by remote control.

Generally stated, the device comprises a solenoid having an armature which moves to close a pair of switch contacts when the solenoid is energized. Said contacts are connected in the circuit of the throttle holder, and they also control the circuit of the solenoid so that when the contacts are closed, the solenoid holds them closed. A second solenoid is mounted on the same base as the first one, and its armature is engaged with said switch contacts in such a way that said contacts are opened upon energization of said second solenoid against the pull of the first solenoid. The second solenoid is connected so as to be energized when the stop light switch of the automobile is closed by depression of the brake pedal. Thus, if, at any time, conditions require a quick application of the brakes, the throttle holder will be automatically released.

A preferred embodiment of the invention is illustrated in the accompanying drawings in which—

Fig. 1 is a side elevation of a controlling device embodying this invention;

Fig. 2 is a top view of the same;

Fig. 3 is an elevational view similar to Fig. 1 but showing different positioning of elements;

Fig. 4 is an exploded view of armature 3;

Fig. 5 is an exploded view of armature 19; and

Fig. 6 is an elevational view similar to Fig. 1 but showing a modification of the device.

Referring to the drawing, 1 designates a base on which the device is mounted and which itself may be arranged for mounting in any convenient place for access by the driver. Mounted on the base 1 is a solenoid 2 having an armature 3 pivoted in the usual manner at 4. A spring 5 is connected at 6 to the outer end of the armature 3, and its other end is hooked into an opening 7 in the plate 8 forming part of magnetic circuit of the solenoid 2. The armature 3 has mounted thereon, between a pair of insulating plates 9 and 10, a flat spring 11 on which is mounted a switch contact 12.

An insulating plate 13, supported in any suitable manner on the base 1, as by upstanding tongues 14 and 15, carries a conducting arm 16 which in turn has mounted thereon second switch contact 17, positioned for engagement by the contact 12. It will be seen that since the contact 12 is on the opposite side of the pivot 4 from the core of the solenoid 2, energization of that solenoid will cause the contact 12 to move clockwise about pivot 4 (Fig. 1) into engagement with the contact 17 to close the circuit controlled by said contacts.

Also mounted on the base 1 is a second solenoid 18, having an armature 19 pivoted at 20 on the plate 21 forming part of the magnetic circuit of said second solenoid. The armature 19 carries a pair of insulating plates 22 and 23, spaced apart slightly at their free ends so as to receive between them the end of the spring 11 which carries the contact 12. It will be noted that when the solenoid 18 is energized, the end of the armature from which the plates 22 and 23 project will move counterclockwise about pivot 20 from the position shown in Fig. 1 to the position shown in Fig. 3. This causes the plate 23 to engage the end of the spring 11, moving the spring 11 in a direction to break its contact with the contact 17. In this movement, the solenoid 18 may have sufficient advantage in leverage over the solenoid 2 to force these contacts apart, or it may simply overcome the strength of the spring 11 to separate said contacts. The right-hand end of the armature 19, Fig. 1, may have attached thereto a manipulating handle 25 by which the armature may be rocked on its pivot 20 to open or close the contacts 12 and 17.

When the device is installed on the car, it is, of course, connected in circuit with the car battery 26, which as usual is grounded on the car frame at 27. From the battery 26, a circuit including the ignition switch 28 and the lead 29, is connected to the contact 12. A conductor 30 connects the contact 17 with the device 31 which holds the throttle valve in whatever position it may be set when the device is energized. The other terminal of this device, of course, is grounded to the car frame at 32. It will be seen that this circuit provides for energizing the device 31 when the contacts 12 and 17 are closed, provided the ignition switch 28 is closed.

The throttle holder 31 may be of any suitable type. The device outlined in the drawing represents a throttle valve A connected by a slip-joint B to a plunger C operated by a solenoid D, when energized, to force the plunger against a stop plug E, whereby the plunger and the valve are held against rotation.

A conductor 33 connects the solenoid 2 with the conductor 30, the other end of the solenoid being grounded at 34. Accordingly, when the contacts 12 and 17 are closed, the solenoid 2 will be energized and will therefore hold them in their closed condition.

The handle 25 of the second solenoid 18 may be moved so as to rock the armature 19 on its pivot 20 in either direction. Movement in one direction, that is counterclockwise about pivot 20 in Fig. 1, of the handle 25 will cause the armature to move the contact 12 into engagement with contact 17 to close the circuit to the device 31 and at the same time close the holding circuit 33 to cause the solenoid 2 to hold these contacts closed. On the other hand, clockwise movement (Fig. 1) of handle 25 about pivot 20 will cause the armature to open the control circuit at the contacts 12 and 17, and thereby render the device 31 inoperative. A conductor 35 connects the solenoid 18 with the stop light switch 36, or other switch operated by the brake pedal 36A on the car, the other end of said solenoid being grounded at 37. By this arrangement, closing the stop light switch by depression of the brake pedal of the car will energize the solenoid 18 causing it to move its armature and thereby move the contact 12 away from the contact 17, thereby breaking the circuit to the device 31. Accordingly, if, while the device 31 is functioning to hold the throttle setting constant, an emergency should arise requiring braking of the car, the act of braking by depression of the brake pedal will close the stop light switch 36, thereby energizing the solenoid 18 to open the control circuit at the contacts 12 and 17. Thereafter, a throttle valve may automatically return to its initial position in the ordinary manner.

An arrangement for operating the device by remote control is shown by the circuit shown in Fig. 6. In this device, a double-throw momentary-contact switch 38 has its movable arm connected by a conductor 39 with the ignition switch 28, as shown. One of the lateral contacts of the switch 38 is connected by a conductor 40 with the conductor 35 to establish an energizing circuit to the solenoid 18. The other lateral contact of said switch is connected by a conductor 41 with the conductor 30 to establish an energizing circuit to the solenoid 2.

In the use of this device, the switch assembly shown in Fig. 6 may be mounted in any convenient place on the car if it is to be handled by remote control. In that case, the switch 38 is positioned for easy access by the driver. When he has attained the desired crusing speed, he depresses the handle of the switch 38 to make a momentary contact, establishing a circuit through the solenoid 2. When this solenoid is energized, it moves its armature clockwise about pivot 4 from the position of Fig. 3 to the position shown in Fig. 6, thereby moving the contact 12 into engagement with the contact 17. This closes the circuit to the device 31 and also the holding circuit through the solenoid 2. The switch 38, upon being released, returns to neutral position. The device 31 is now energized to hold the throttle setting constant at the desired speed. When it is desired to slow down or change speed, the handle of the switch 38 is raised to a momentary contact with the upper contact. This establishes the circuit through a the solenoid 18 which causes its armature to move clockwise about pivot 20 from the position of Fig. 6 to the position shown in Fig. 3 so as to disengage contacts 12 and 17, and hence break the control circuit. If the device is to be operated by direct manipulation without any remote control circuit, the device is mounted for access by the driver so that he may manipulate the handle 25. By moving said handle 25 counterclockwise about pivot 20 from the position shown in Fig. 3 to that shown in Fig. 1, he closes the contacts 12 and 17, and thereby actuates the device 31 and energizes the solenoid 2 to hold the circuit closed. When the adjustment is to be changed, movement of the handle 25 clockwise about pivot 20 from the position of Fig. 1 to that of Fig 3 will open the circuit at the contacts 12 and 17. Under either condition, that is, whether the device is operated by direct manipulation or by remote control, when the contacts 12 and 17 are closed, depression of the brake pedal to apply the car brakes closes the switch 36, thereby energizes the solenoid 18, which then acts to open the circuit at the contacts 12 and 17.

It will be seen that this device provides a simple arrangement whereby such a throttle holding device may be used effectively and without danger of complicating the control of the car. It may easily be manipulated either manually or by remote control, and if, while it is active, any situation arises requiring quick braking, the device will be released by the action of the stop light switch and will then free the throttle to return in its normal manner to its initial position. Accordingly, future control of the throttle or the accelerating pedal may be carried out in the normal manner as if no throttle holding device were used. Accordingly, the normal procedure of operating the car is not changed.

Various changes may be made in the details of construction, within the scope of the appended claims, without departing from the spirit of this invention. Parts of the invention may be used without the whole and improvements may be added while retaining some or all of the advantages of the invention.

I claim:

1. In a device of the character described having electrically-operated holding means, a control switch for said holding means having first solenoid means with an armature connected to said control switch, energizing-circuit connections for said first solenoid means passing through said switch for holding the switch closed after the switch is once closed, and means for operating said control switch including a manipulating element connected to said control switch and operable normally to open and close said switch, and a second solenoid means excitable to operate said manipulating element to open said switch.

2. In a device of the character described having electrically-operated holding means, a control switch for said holding means having a first solenoid means for holding the switch closed after being closed initially, energizing-circuit connections for said first solenoid means passing through said control switch, and means for operating said control switch including a second solenoid having a pivoted armature movable on its pivot upon energization of said second solenoid, a connection from said armature to said control switch for opening said control switch upon energization of said second solenoid, and a manipulating handle attached to said armature for moving the armature manually to open or close said control switch.

3. A device of the character described, comprising, a base, a first solenoid mounted on said base, a first armature pivoted on said base for movement upon energization of said solenoid, a second solenoid mounted on said base, a second armature pivoted on said base for movement upon energization of said second solenoid, a member attached to one armature and engaging the other armature, a switch contact on said member, a second contact fixed on but insulated from said base and positioned for engagement by said first contact, means for closing said contacts, energizing-circuit connections for said first solenoid passing through said contacts to connect said first solenoid in series with said contacts for holding the contacts closed after the contacts are once closed, said second armature operating upon movement thereof by energization of said second solenoid to move said flexible member to separate said contacts.

4. A device of the character described, comprising, a base, a first solenoid mounted on said base, a first armature pivoted on said base for movement upon energization of said solenoid, a second solenoid mounted on said base, a second armature pivoted on said base for movement upon energization of said second solenoid, a flexible member attached to one armature and engaging the other armature, a switch contact on said member, a second contact fixed on but insulated from said base and positioned for engagement by said first contact upon movement of said first armature, energizing-circuit connections for said first solenoid passing through said contacts to connect said first solenoid in series with said contacts for holding the contacts closed after once being closed, said second armature operating upon movement thereof by energization of said second solenoid to move said flexible member to separate said contacts, and a manipulating handle on said second armature adapted by the connection with the flexible member to open and close said contacts.

5. In combination with a device as defined in claim 4, a brake, connections from said brake and said first solenoid through said contacts to a source of voltage supply, a stop-light switch, and connections from said second solenoid through said stop-light switch to said source of supply.

6. A device of the character described, comprising, a base, a pair of relatively movable switch contacts on said base, a first solenoid on said base connected for energization through said contacts and having an armature connected to one of said switch contacts, means for initially closing said contacts, the armature of the said first solenoid holding the contacts closed after being initially closed, and a second solenoid on said base having an armature connected to the same switch contact connected to the other armature to open said contacts upon energization.

7. A device of the character described, comprising, a base, a pair of relatively movable switch contacts on said base, a first solenoid on said base connected for energization through said contacts and having an armature connected to one of said contacts, the armature of the said first solenoid holding the contacts closed after being initially closed, a second solenoid on said base having an armature connected to one of said contacts to open said contacts upon energization, and a manipulating handle on said second armature operable to close and open said contacts.

References Cited in the file of this patent

UNITED STATES PATENTS

| | | |
|---|---|---|
| 2,262,061 | Somers | Nov. 11, 1941 |
| 2,425,190 | Johnson | Aug. 5, 1947 |
| 2,467,485 | Krieg | Apr. 19, 1949 |
| 2,604,115 | Munson | July 22, 1952 |
| 2,822,902 | Glick | Feb. 11, 1958 |